(12) United States Patent
Nakamura et al.

(10) Patent No.: US 10,516,646 B2
(45) Date of Patent: Dec. 24, 2019

(54) VIDEO SIGNAL TRANSMISSION SYSTEM

(71) Applicant: MEDIA GLOBAL LINKS CO., LTD., Kawasaki-shi, Kanagawa (JP)

(72) Inventors: Kazunori Nakamura, Kawasaki (JP); Kazuki Narita, Kawasaki (JP)

(73) Assignee: MEDIA LINKS CO., LTD., Kawasaki (JP)

( * ) Notice: Subject to any disclaimer, the term of this patent is extended or adjusted under 35 U.S.C. 154(b) by 254 days.

(21) Appl. No.: 15/258,626

(22) Filed: Sep. 7, 2016

(65) Prior Publication Data

US 2017/0078242 A1 Mar. 16, 2017

(30) Foreign Application Priority Data

Sep. 10, 2015 (JP) ................................. 2015-178774

(51) Int. Cl.
*H04L 29/12* (2006.01)
*H04L 12/28* (2006.01)
(Continued)

(52) U.S. Cl.
CPC ...... *H04L 61/2007* (2013.01); *H04L 12/2863* (2013.01); *H04L 61/6022* (2013.01);
(Continued)

(58) Field of Classification Search
CPC ...... H04L 1/20; H04L 25/03248; H04L 12/44
See application file for complete search history.

(56) References Cited

U.S. PATENT DOCUMENTS 6,751,219 B1 * 6/2004 Lipp .................... H04L 49/201
                                                        370/390
6,934,280 B1 * 8/2005 Ho ..................... H04L 12/4633
                                                        370/352
(Continued)

FOREIGN PATENT DOCUMENTS

FR          2895181 A1     6/2007
JP       2005-277915 A    10/2005
(Continued)

OTHER PUBLICATIONS

KDDI R&D Laboratories, Inc., "Link Aggregation Radio Technology", Technological Crossover, (Aug. 2012), [online], KDDI R&D Laboratories Inc. Website, [Searched on Jul. 22, 2015], Internet (URL: <http://www.kddilabs.jp/assets/files/technology/72.pdf>), (now available at http://www.juniper.net/techpubs/en_US/junose15.1/topics/concept/802.3ad-link-aggregation-understanding.html).

(Continued)

*Primary Examiner* — Barbara B Anyan
(74) *Attorney, Agent, or Firm* — Oliff PLC

(57) ABSTRACT

The present invention provides a transmitter including a first source network interface connected to a first transmission path of a plurality of transmission paths, an nth source network interface connected to an nth transmission path of the plurality of transmission paths, a video signal segmenting unit configured to segment a video signal into a plurality of pieces of data, a sequence number allocating unit configured to allocate a sequence number to each of the plurality of pieces of data, an IP packet generating unit configured to generate a plurality of IP packets by adding IP headers to the plurality of pieces of data, and a transmitting unit configured to allocate each of the plurality of IP packets to one of the first source network interface to the nth source network
(Continued)

interface, respectively, and to transmit the IP packets independently.

6 Claims, 11 Drawing Sheets

(51) Int. Cl.
    *H04L 29/06*     (2006.01)
    *H04L 1/18*     (2006.01)
    *H04L 12/931*     (2013.01)
    *H04L 12/707*     (2013.01)
    *H04L 12/803*     (2013.01)

(52) U.S. Cl.
    CPC ............ H04L 65/60 (2013.01); H04L 65/602 (2013.01); H04L 69/14 (2013.01); *H04L 1/188* (2013.01); *H04L 1/1841* (2013.01); *H04L 45/24* (2013.01); *H04L 47/125* (2013.01); *H04L 49/201* (2013.01)

(56) References Cited

U.S. PATENT DOCUMENTS

| | | | |
|---|---|---|---|
| 8,233,483 B2 * | 7/2012 | Enomoto | H04L 1/1841 370/230 |
| 2003/0149792 A1 | 8/2003 | Goldstein | |
| 2007/0033391 A1 * | 2/2007 | Hiramatsu | H04L 63/0435 713/153 |
| 2010/0128809 A1 * | 5/2010 | Maeda | H04L 25/03248 375/262 |
| 2010/0208786 A1 * | 8/2010 | Miyazaki | H04J 3/085 375/228 |
| 2014/0153574 A1 * | 6/2014 | Louzoun | H04L 1/188 370/392 |

FOREIGN PATENT DOCUMENTS

| | | |
|---|---|---|
| JP | 2010-278799 A | 12/2010 |
| JP | 2014-230057 A | 12/2014 |
| JP | 2015-138990 A | 7/2015 |
| WO | 2013/162569 A1 | 10/2013 |
| WO | 2014/181381 A1 | 11/2014 |

OTHER PUBLICATIONS

Jan. 10, 2017 Office Action issued in Japanese Patent Application No. 2015-178774.
Jan. 10, 2017 Extended Search Report issued in European Patent Application No. 16187673.5.

\* cited by examiner

VIDEO SIGNAL TRANSMISSION SYSTEM

CROSS-REFERENCES TO RELATED APPLICATIONS

This application claims the benefit of Japanese Patent Application No. 2015-178774, filed Sep. 10, 2015, which is hereby incorporated by reference wherein in its entirety.

BACKGROUND OF THE INVENTION

Field of the Invention

The present invention relates to a video signal transmission system, or more specifically, to a video signal transmission system for distributing video signals through a plurality of transmission paths.

Description of the Related Art

Video signals are transmitted by means of multicast in various cases where a video image shot with a camera installed in a stadium is transmitted to a broadcast station, and where a video image is transmitted from a broadcast station. When such a video signal is transmitted, the video signal is converted into IP packets, which are then transmitted through an IP network. Conventional IP transmission of the video signal has been based on the premise that a plurality of video streams are transmitted by using one network interface. For example, up to six HD (high definition) uncompressed transmission streams can be transmitted through the Ethernet (registered trademark) with a transmission rate of 10 Gbps.

Nonetheless, higher-definition and higher-volume video standards such as 4K and 8K are being put into practice in these years, and bit rates of these video signals are about to exceed bit rates in the conventional network infrastructure. For instance, 4K corresponds to a bit rate of 12 Gbps and cannot be transmitted through the 10-Gbps Ethernet. Further, 8K corresponds to a bit rate greater than 140 Gbps and cannot be transmitted even through the 100-Gbps Ethernet.

To deal with this problem, there is a technique called "link aggregation" to improve a communication speed and fault tolerance by regarding a plurality of transmission paths (Ethernet paths) virtually as one transmission path. Since the plurality of transmission paths are regarded as one transmission path, using the link aggregation can improve a bit rate by transmitting packets in parallel. For example, even when each Ethernet path has a transmission rate of 100 Gbps, it is possible to achieve a bit rate of 300 Gbps by aggregating three Ethernet paths of this type together (see KDDI R&D Laboratories, Inc., "Link Aggregation Radio Technology", Technological Crossover, (August 2012), [online], KDDI R&D Laboratories Inc. Website, [Searched on Jul. 22, 2015], Internet (URL: http://www.kddilabs.jp/assets/files/technology/72.pdf), now available at http://www.juniper.net/techpubs/en_US/junose15.1/topics/concept/802.3ad-link-aggregation-understanding.html).

SUMMARY OF THE INVENTION

The link aggregation achieves the one virtual transmission path by segmenting a video signal to be transmitted into a plurality of packets and distributing the packets to the plurality of transmission paths. However, the link aggregation has the following problems.

In the link aggregation, packets to be transmitted are distributed to the transmission paths on the basis of a source MAC address or a destination MAC address (a data link layer) of each packet, or a source IP address or a destination IP address (a network layer) thereof, and the like. In this method, even when a large-volume video signal is segmented into a plurality of packets, the plurality of packets have the same source MAC address, and are passed through the same transmission path after all. As a consequence, the link aggregation causes a problem of being unable to achieve proper distribution when transmitting large-volume packets.

In addition, video signals are transmitted through WAN. Accordingly, the link aggregation needs to be implemented not only on a transmission path down to a network device such as a switch connected to a video signal transmission system, but also over the entire paths including transmission paths from the network device to receivers. Such a requirement involves a large-scale physical infrastructure and is therefore impractical.

Furthermore, in the link aggregation, if one of transmission paths fails in use, the transmission continues by using the remaining transmission paths (automatic fallback). For example, in an infrastructure where there are a virtual transmission path 1 having a transmission rate of 200 Gbps formed by aggregating two Ethernet paths each having a transmission rate of 100 Gbps and a virtual transmission path 2 having a transmission rate of 300 Gbps formed by aggregating three Ethernet paths of the same type, if one of the Ethernet paths in the virtual transmission path 1 fails, then the virtual transmission path 1 will be bound to continue the transmission at a bit rate of 100 Gbps (that is, the packets to be transmitted on the virtual transmission path 1 cannot be passed over to the virtual transmission path 2 in response to such a failure).

Japanese Patent Laid-Open No. 2010-278799 discloses a content transmitter and a content receiver which do not deteriorate video quality. According to the invention of Japanese Patent Laid-Open No. 2010-278799, when a certain transmission path fails in the course of transmitting contents on the relevant transmission path whereby a transmission performance is deteriorated, the content transmitter sends pieces of content data to the content receiver through all the transmission paths while allocating sequence numbers to the respective pieces of content data. Then, the content receiver receives the pieces of content data through all the transmission paths, and performs reception processing by selecting a piece of the content data arrived first for each sequence number. In addition, the invention according to Japanese Patent Laid-Open No. 2010-278799 is designed to distribute the contents to the transmission paths, thereby enabling transmission of the contents without imposing a burden on a particular transmission path.

However, while the invention according to Japanese Patent Laid-Open No. 2010-278799 can avoid deterioration in video quality, this invention is not designed to efficiently distribute the contents to be transmitted. Neither is this invention designed to transmit a large-volume video signal by distributing the signal. What is more, the invention according to Japanese Patent Laid-Open No. 2010-278799 is not designed to solve the problems of the link aggregation as mentioned above.

The present invention has been made in view of the aforementioned problems. The present invention provides a video signal transmission system, which is capable of performing efficient load distribution of a large-volume video signal by transmitting independent IP packets generated from the video signal through a plurality of transmission paths.

In order to solve the aforementioned problems, a video signal transmission system according to the present invention is a transmitter configured to transmit a video signal to a receiver, the transmitter and the receiver being connected to each other through an IP network by using a plurality of transmission paths, the transmitter comprising: a first source network interface connected to a first transmission path of the plurality of transmission paths; an nth source network interface connected to an nth transmission path of the plurality of transmission paths; a video signal segmenting unit configured to segment the video signal into a plurality of pieces of data; a sequence number allocating unit configured to allocate a sequence number to each of the segmented plurality of pieces of data; an IP packet generating unit configured to generate a plurality of IP packets by adding IP headers to the plurality of pieces of data, respectively, to which the sequence numbers are allocated; and a transmitting unit configured to allocate each of the generated plurality of IP packets to one of the first source network interface to the nth source network interface, respectively, and to transmit the IP packets independently.

According to the video signal transmission system of the present invention, by performing efficient load distribution of a video signal, the system can perform large-volume video transmission without requiring a large-scale physical infrastructure such as in the link aggregation.

Further features of the present invention will become apparent from the following description of exemplary embodiments (with reference to the attached drawings).

DESCRIPTION OF THE EMBODIMENTS

A video signal transmission system of the present invention will be described below with reference to the accompanying drawings. The video signal transmission system according to the present invention is applicable to a case of transmitting video signals such as 12G-SDI signal, 3G-SDI signal, and HD-SDI signal. It is to be noted, however, that the present invention is not limited only to these applications.

<System Configuration>

Figure 1:
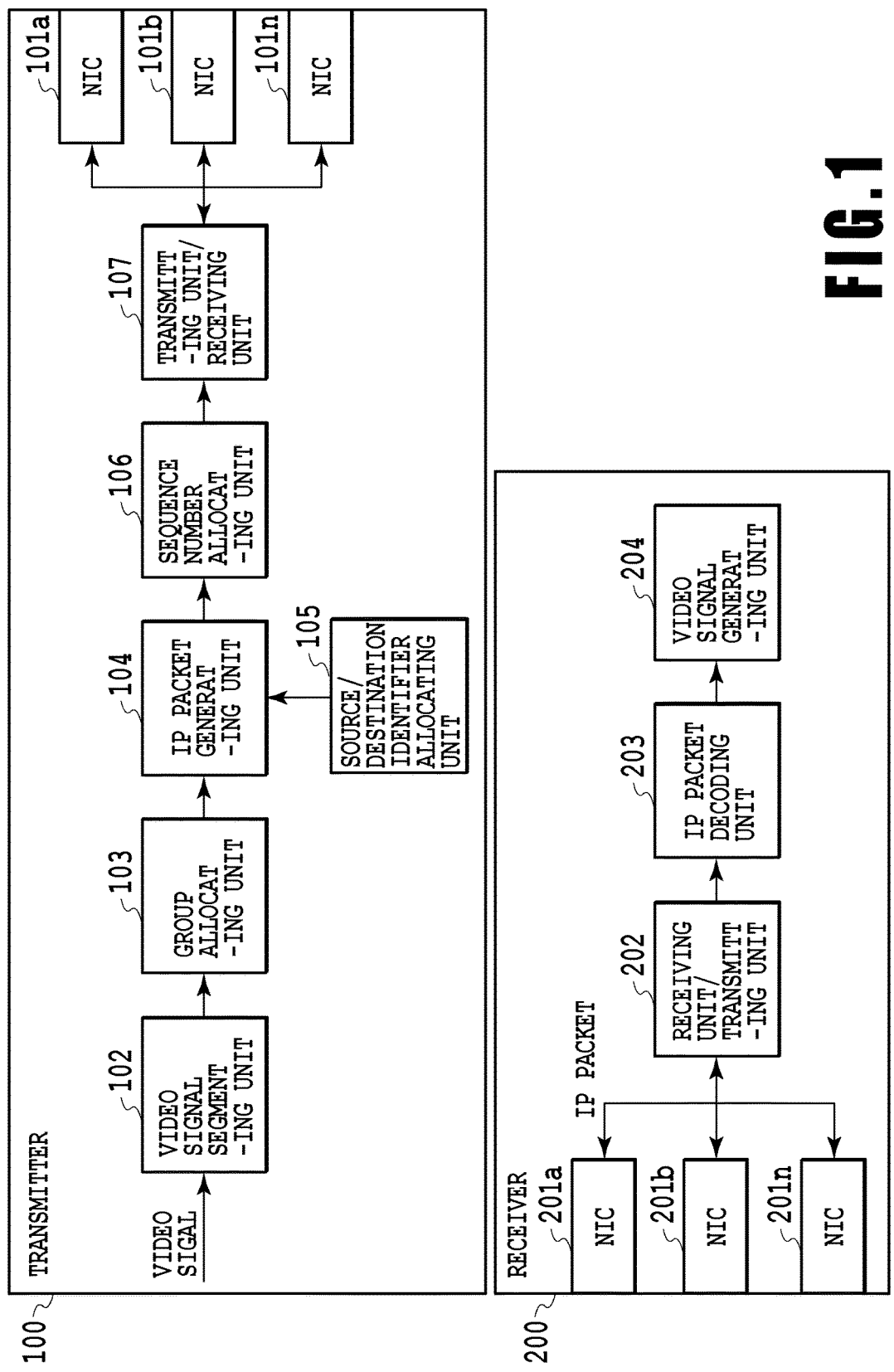
FIG. 1 a block diagram showing an example of a configuration of a video signal transmission system according to an embodiment of the present invention.

FIG. 1 is a block diagram showing an example of a configuration of a video signal transmission system according to an embodiment of the present invention. The video signal transmission system comprises a transmitter 100 and a receiver 200, which are connected to each other through an IP network 300. The transmitter 100 is a device configured to convert a video signal into IP packets and to perform IP transmission of the IP packets to the receiver 200. The receiver 200 is a device configured to receive the IP packets from the transmitter 100 and to generate the original video signal.

The transmitter 100 includes a network interface card (NIC) 101a, an NIC 101b, ... an NIC 101n (n is any given value), a video signal segmenting unit 102, a group allocating unit 103, an IP packet generating unit 104, a source/destination identifier allocating unit 105, a sequence number allocating unit 106, and a transmitting unit/receiving unit 107.

The network interface card (NIC) 101a to the NIC 101n are network adapters each of which is configured to transmit and receive signals between the transmitter 100 and a network device such as a switch connected thereto (hereinafter referred to as the "network device") through a physical transmission path (Ethernet) provided therebetween. The same virtual LAN (VLAN) ID or the same IP address may be allocated to the respective NICs, or different virtual VLAN IDs or different IP addresses may be allocated to the respective NICs. Note that, of course, different MAC addresses are allocated to the respective NICs.

The video signal segmenting unit 102 segments the video signal into a plurality of fixed-length pieces of data. The group allocating unit 103 forms the plurality of pieces of data segmented by the video signal segmenting unit 102 into groups each containing one or more pieces of data.

Using the segmented pieces of data, the IP packet generating unit 104 generates IP packets as defined in the RTP/IP protocol in order to perform IP transmission of the segmented pieces of data. Specifically, each IP packet is generated by adding a RTP header (an application layer), an IP header (a network layer), and an MAC header (a data link layer) in respective layers as defined in the TCP/IP suite respectively. In this case, a given VLAN ID (the network layer and/or the data link layer) is also added as appropriate.

The source/destination identifier allocating unit 105 allocates a source identifier and/or a destination identifier when the IP packet generating unit 104 adds the IP header and the MAC header. The source identifier includes a VLAN ID, an IP address, and/or an MAC address of a source (the transmitter 100), for example. The destination identifier includes a VLAN ID, an IP address, and/or an MAC address of a destination (the receiver 200), for example. The allocated source identifier and/or the allocated destination identifier are set to the respective headers of the corresponding layers.

The sequence number allocating unit 106 allocates sequence numbers to the respective IP packets generated by the IP packet generating unit 104. A specific example of allocating sequence numbers will be described later.

The transmitting unit/receiving unit 107 transmits the respective IP packets, which are generated by the IP packet generating unit 104, on a per-packet basis through one of the NIC 101a to the NIC 101n. A specific example as to how to select one of the NIC 101a to the NIC 101n to transmit each IP packet in this case will be described later. In addition, the transmitting unit/receiving unit 107 receives a control signal such as ACK/NACK from the receiver 200.

The receiver 200 includes an NIC 201a, an NIC 201b, . . . an NIC 201n (n is any given value), a receiving unit/transmitting unit 202, an IP packet decoding unit 203, and a video signal generating unit 204.

The NIC 201a to the NIC 201n are network adapters each of which is configured to transmit and receive signals between the receiver 200 and a network device connected thereto, through a physical transmission path (Ethernet) provided therebetween. The same virtual LAN (VLAN) ID or the same IP address may be allocated to the respective NICs, or different virtual VLAN IDs or different IP addresses may be allocated to the respective NICs. Note that, of course, different MAC addresses are allocated to the respective NICs.

The receiving unit/transmitting unit 202 receives the respective IP packets transmitted from the transmitter 100 through one of the NIC 201a to the NIC 201n. In addition, the receiving unit/transmitting unit 202 transmits the control signal such as the ACK/NACK to the transmitter 100.

The IP packet decoding unit 203 deletes the IP headers and the like from the received IP packets. Due to this processing, the plurality of pieces of data, which are formed by segmenting the video signal on the transmitter 100, are retrieved from the received IP packets.

The video signal generating unit 204 rearranges the plurality of pieces of data retrieved through the above-described processing based on the sequence numbers allocated thereto by the transmitter 100, thereby generating (decoding) the video signal. An example of details of the data rearrangement processing will be described later.

<First Embodiment>

Figure 2:
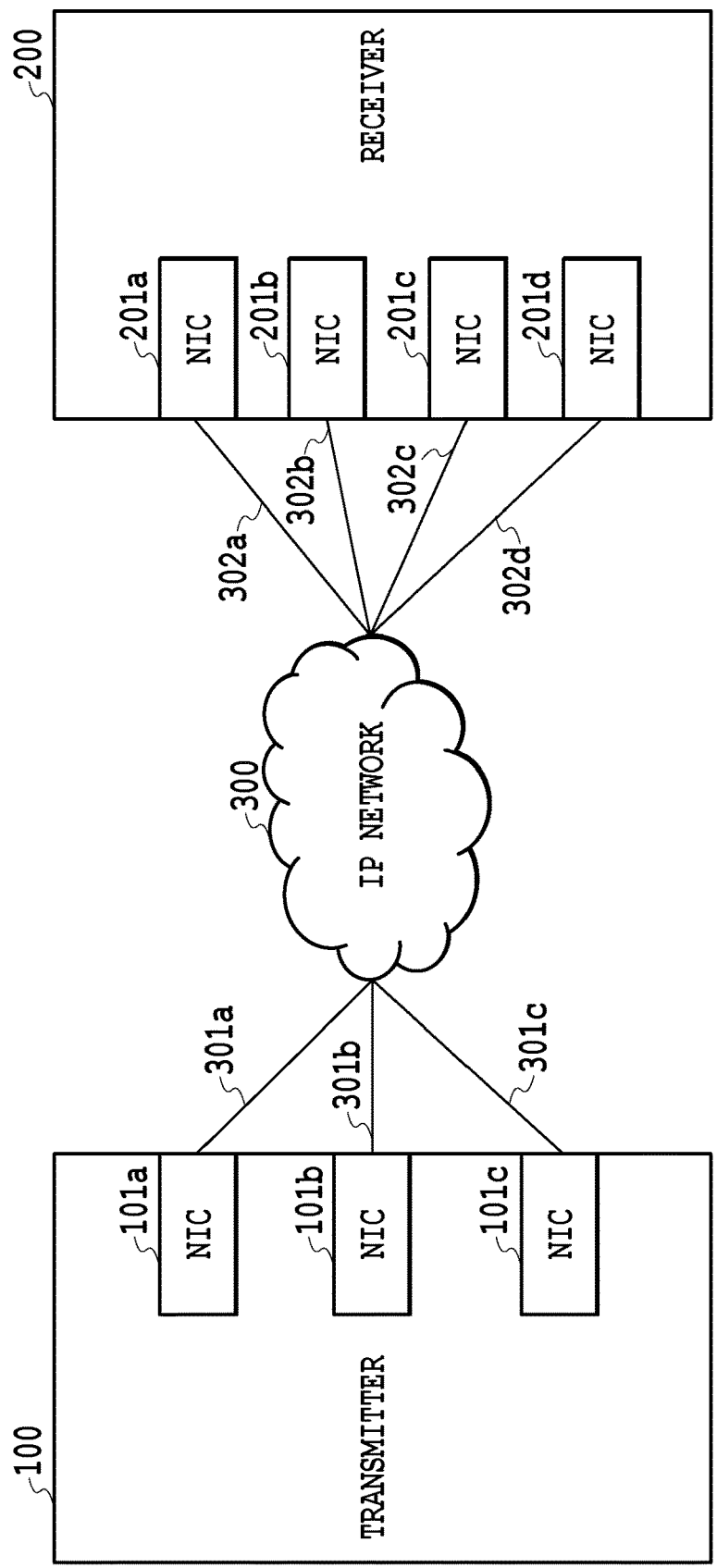
FIG. 2 is a diagram showing an example of transmission paths of a video signal transmission system according to a first embodiment of the present invention.

Next, an example of a video signal transmission system according to a first embodiment of the present invention will be described. FIG. 2 shows an example of transmission paths of the video signal transmission system according to the first embodiment of the present invention. As shown in FIG. 2, the transmitter 100 and the receiver 200 are connected to each other through the IP network 300. Transmission side paths 301a, 301b, and 301c are provided between the transmitter 100 and the IP network 300 (the network device), and are connected to the NICs 101a to 101c, respectively. The transmission side paths 301a to 301c have transmission rates that are equal among them.

Reception side paths 302a, 302b, 302c, and 302d are provided between the receiver 200 and the IP network 300, and are connected to the NICs 201a to 201d, respectively. The reception side paths 302a to 302d have transmission rates that are equal among them.

While this embodiment adopts the three-to-four path configuration by establishing connection using the three transmission side paths and the four reception side paths, it is to be noted that the aforementioned path configuration between the transmission side and the reception side is merely exemplary. Such a path configuration may include the same number of the transmission side paths and the reception side paths, or may adopt a 100-to-200 path configuration, for example.

In the transmitter 100, source identifiers including the VLAN IDs, the IP addresses, and the MAC addresses are set to the NICs 101a to 101c respectively, as shown in Table 1.

TABLE 1

Example of Configuration of Source Identifiers

| NIC 101a | VLAN: V11<br>IP Address: 192.168.3.11<br>MAC Address: 78-2B-CB-B7-00-01 |
| --- | --- |
| NIC 101b | VLAN: V12<br>IP Address: 192.168.3.12<br>MAC Address: 78-2B-CB-B7-00-02 |
| NIC 101c | VLAN: V33<br>IP Address: 192.168.3.13<br>MAC Address: 78-2B-CB-B7-00-03 |

In the receiver 200, destination identifiers including the VLAN IDs, the IP addresses, and the MAC addresses are set to the NICs 201a to 201d respectively, as shown in Table 2.

TABLE 2

Example of Configuration of Destination Identifiers

| NIC 201a | VLAN: V21<br>IP Address: 192.168.4.11<br>MAC Address: 78-2B-CB-B7-10-01 |
| --- | --- |
| NIC 201b | VLAN: V22<br>IP Address: 192.168.4.12<br>MAC Address: 78-2B-CB-B7-10-02 |
| NIC 201c | VLAN: V23<br>IP Address: 192.168.4.13<br>MAC Address: 78-2B-CB-B7-10-03 |
| NIC 201d | VLAN: V24<br>IP Address: 192.168.4.14<br>MAC Address: 78-2B-CB-B7-10-04 |

In this embodiment, different VLAN IDs and different IP addresses are set to the NICs 101a to 101c, and to the NICs 201a to 201d, respectively. However, the same VLAN ID and the same IP address may be set to the NICs 101a to 101c, and the same VLAN ID and the same IP address may be set to the NICs 201a to 201d, respectively. Here, the VLAN IDs may not be set.

Figure 3:
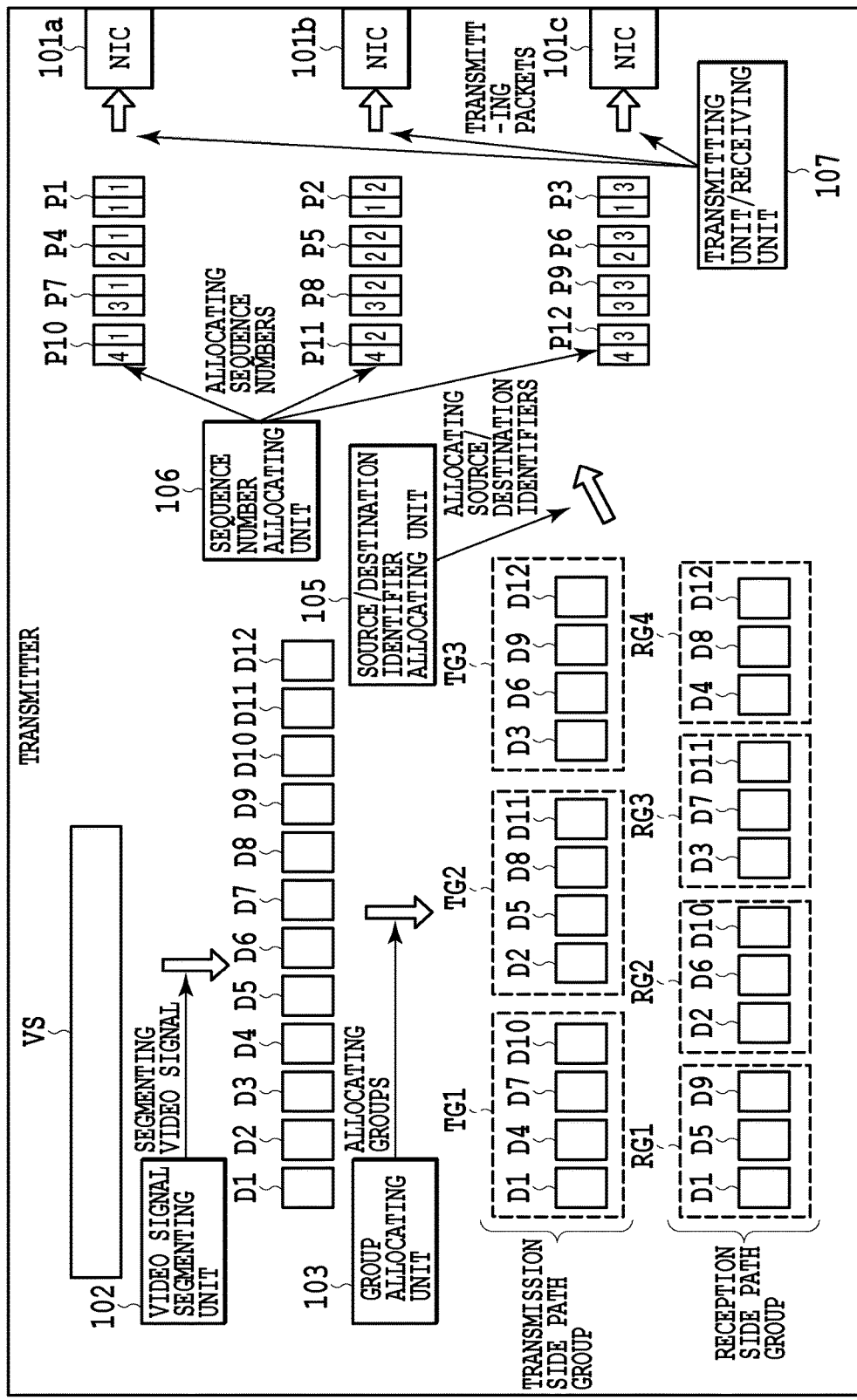
FIG. 3 is a diagram showing an example of processing steps to be performed on a transmitter side of the video signal transmission system according to the first embodiment of the present invention.

Next, an example of processing steps to be performed by the transmitter 100 will be described with reference to FIG. 3. First, the video signal segmenting unit 102 segments a video signal VS into twelve fixed-length pieces of data D1 to D12. Although the video signal VS is segmented into the twelve pieces of data in this embodiment for the sake of convenience, the number of the segmented pieces of data is merely exemplary. The same applies to a second embodiment and a third embodiment to be described later.

Next, the group allocating unit 103 forms the segmented pieces of data D1 to D12 into groups (hereinafter "transmission side path groups") TG1 to TG3 corresponding to the transmission side paths 301a to 301c, respectively, while allocating one or more pieces of data to each of the groups. Moreover, the group allocating unit 103 forms the segmented pieces of data D1 to D12 into groups (hereinafter "reception side path groups") RG1 to RG4 corresponding to the reception side paths 302a to 302d, respectively, while allocating one or more pieces of data to each of the groups. The grouping of the segmented pieces of data D1 to D12 into the transmission side path groups is shown in Table 3.

TABLE 3

Example of Transmission Side Path Groups

| Segmented Pieces of Data | Transmission Side Path Group |
| --- | --- |
| Pieces of Data D1, D4, D7, and D10 | Transmission Side Path Group TG1 |
| Pieces of Data D2, D5, D8, and D11 | Transmission Side Path Group TG2 |
| Pieces of Data D3, D6, D9, and D12 | Transmission Side Path Group TG3 |

In addition, the grouping of the segmented pieces of data D1 to D12 into the reception side path groups is shown in Table 4.

TABLE 4

Example of Reception Side Path Groups

| Segmented Pieces of Data | Reception Side Path Group |
| --- | --- |
| Pieces of Data D1, D5, and D9 | Reception Side Path Group RG1 |
| Pieces of Data D2, D6, and D10 | Reception Side Path Group RG2 |
| Pieces of Data D3, D7, and D11 | Reception Side Path Group RG3 |
| Pieces of Data D4, D8, and D12 | Reception Side Path Group RG4 |

The transmission side path group and the reception side path group, to which each of the pieces of data D1 to D12 belongs as determined by the group allocating unit 103, are used when the source/destination identifier allocating unit 105 to be described later allocates a source identifier and a destination identifier thereto, respectively. That is, a source identifier is allocated to each transmission side path group and a destination identifier is allocated to each reception side path group.

In order to distinguish the transmission side path groups TG1 to TG3 and the reception side path groups RG1 to RG4, each of the pieces of data D1 to D12 that belongs to a certain group may be provided with a header to which a group identifier corresponding thereto is set. Alternatively, such a group identifier may be set to a reserved field in a payload part.

Next, the source/destination identifier allocating unit 105 allocates the source identifier to each of the transmission side path groups TG1 to TG3, to which each of the pieces of data D1 to D12 belongs. Here, the VLAN ID, the IP address, and the MAC address set to each of the NICs 101a to 101c mentioned above are allocated as the source identifier. As mentioned previously, the VLAN IDs and the IP addresses set to the respective NICs 101a to 101c may be the same or different among them. As in the case of the source identifier, the VLAN ID, the IP address, and the MAC address set to each of the NICs 201a to 201d mentioned above are allocated as the destination identifier to each of the reception side path groups RG1 to RG4, to which each of the pieces of data D1 to D12 belongs.

The method of allocating the source identifiers to the respective transmission side path groups is performed in round-robin fashion in this embodiment. Specifically, as shown in Table 5, the source identifiers set to the NICs 101a to 101c are allocated in the order of the transmission side path groups TG1 to TG3.

TABLE 5

Example of Source Identifier Allocation

| Transmission Side Path Group | Allocated Source Identifier |
| --- | --- |
| Transmission Side Path Group TG1 | Source Identifier of NIC 101a |
| Transmission Side Path Group TG2 | Source Identifier of NIC 101b |
| Transmission Side Path Group TG3 | Source Identifier of NIC 101c |

Regarding the destination identifiers as well, the destination identifiers set to the NICs 201a to 201d are allocated in the order of the reception side path groups RG1 to RG4 as shown in Table 6. The source identifiers and the destination identifiers thus allocated are set to headers of respective layers such as the IP headers by the IP packet generating unit 104, and the headers are added to the respective pieces of data D1 to D12 and thus formed into IP packets P1 to P12.

TABLE 6

Example of Destination Identifier Allocation

| Reception Side Path Group | Allocated Destination Identifier |
| --- | --- |
| Reception Side Path Group RG1 | Destination Identifier of NIC 201a |
| Reception Side Path Group RG2 | Destination Identifier of NIC 201b |
| Reception Side Path Group RG3 | Destination Identifier of NIC 201c |
| Reception Side Path Group RG4 | Destination Identifier of NIC 201d |

As described above, the transmission side path for transmitting each IP packet between the transmitter 100 and the IP network 300 is determined as a consequence of allocating the source identifier as described above. Specifically, the IP packets P1, P4, P7, and P10 to which the source identifier of the NIC 101a is allocated are passed through the transmission side path 301a (meanwhile, the IP packets P2, P5, P8, and P11 are passed through the transmission side path 301b, and the IP packets P3, P6, P9, and P12 are passed through the transmission side path 301c).

In addition, the reception side path for transmitting each IP packet between the receiver 200 and the IP network 300 is determined as a consequence of allocating the destination identifier as described above. Specifically, the IP packets P1, P5, and P9 to which the destination identifier of the NIC 201a is allocated are passed through the reception side path 302a (meanwhile, the IP packets P2, P6, and P10 are passed through the reception side path 302b, the IP packets P3, P7, and P11 are passed through the reception side path 302c, and the IP packets P4, P8, and P12 are passed through the reception side path 302d).

Here, as described previously, the sets of the VLAN IDs, the IP addresses, and the MAC addresses, all of which have different values within the relevant sets are allocated to the transmission side paths 301a to 301c in this embodiment. However, it is not always necessary to do so. Specifically, one of the sets of the VLAN IDs, the IP addresses, and the MAC addresses having different values within the set may be allocated to the transmission side paths 301a to 301c, respectively, and it is thus possible to allocate the transmission side path to each IP packet (the same applies to the reception side paths 302a to 302d). Moreover, the same applies to the second embodiment and the third embodiment to be described later.

Upon the source identifiers and the destination identifiers are allocated, the sequence number allocating unit 106 allocates the sequence numbers to the transmission side path groups TG1 to TG3 respectively, and adds the sequence numbers to the IP packets P1 to P12 to be transmitted respectively. Here, two types of sequence numbers are allocated as the sequence numbers. Regarding first sequence numbers, sequential numbers are allocated to the IP packets in each of the three transmission side path groups TG1 to TG3. Meanwhile, regarding second sequence numbers, sequential numbers are allocated to each set of the IP packets to which the same first sequence number is allocated. Table 7 shows allocation rules for the first sequence numbers and the second sequence numbers.

TABLE 7

Example of Sequence Number Allocation

| Transmission Side Path Group | IP Packet | First Sequence Number | Second Sequence Number |
|---|---|---|---|
| TG1 | P1 | 1 | 1 |
|  | P4 | 2 | 1 |
|  | P7 | 3 | 1 |
|  | P10 | 4 | 1 |
| TG2 | P2 | 1 | 2 |
|  | P5 | 2 | 2 |
|  | P8 | 3 | 2 |
|  | P11 | 4 | 2 |
| TG3 | P3 | 1 | 3 |
|  | P6 | 2 | 3 |
|  | P9 | 3 | 3 |
|  | P12 | 4 | 3 |

As shown in Table 7, since the IP packets P1, P4, P7, and P10 belong to the transmission side path group TG1, the first sequence numbers 1 to 4 are allocated to the IP packets in the transmission side path group TG1, respectively. The first sequence numbers 1 to 4 are also allocated to the rest of the IP packets in each of the transmission side path groups to which the IP packets belong. In addition, since the first sequence number 1 is allocated to the IP packets P1 to P3, the second sequence numbers 1 to 3 are allocated to the IP packets P1 to P3, respectively (the second sequence numbers are also allocated to the rest of the IP packets likewise).

The aforementioned sequence numbers may employ RTP sequence numbers set in the RTP headers. Alternatively, the sequence numbers may be set by using reserved fields in the IP headers, the MAC headers, the payload, and the like. The same applies to the second embodiment and the third embodiment to be described later.

Figure 4:
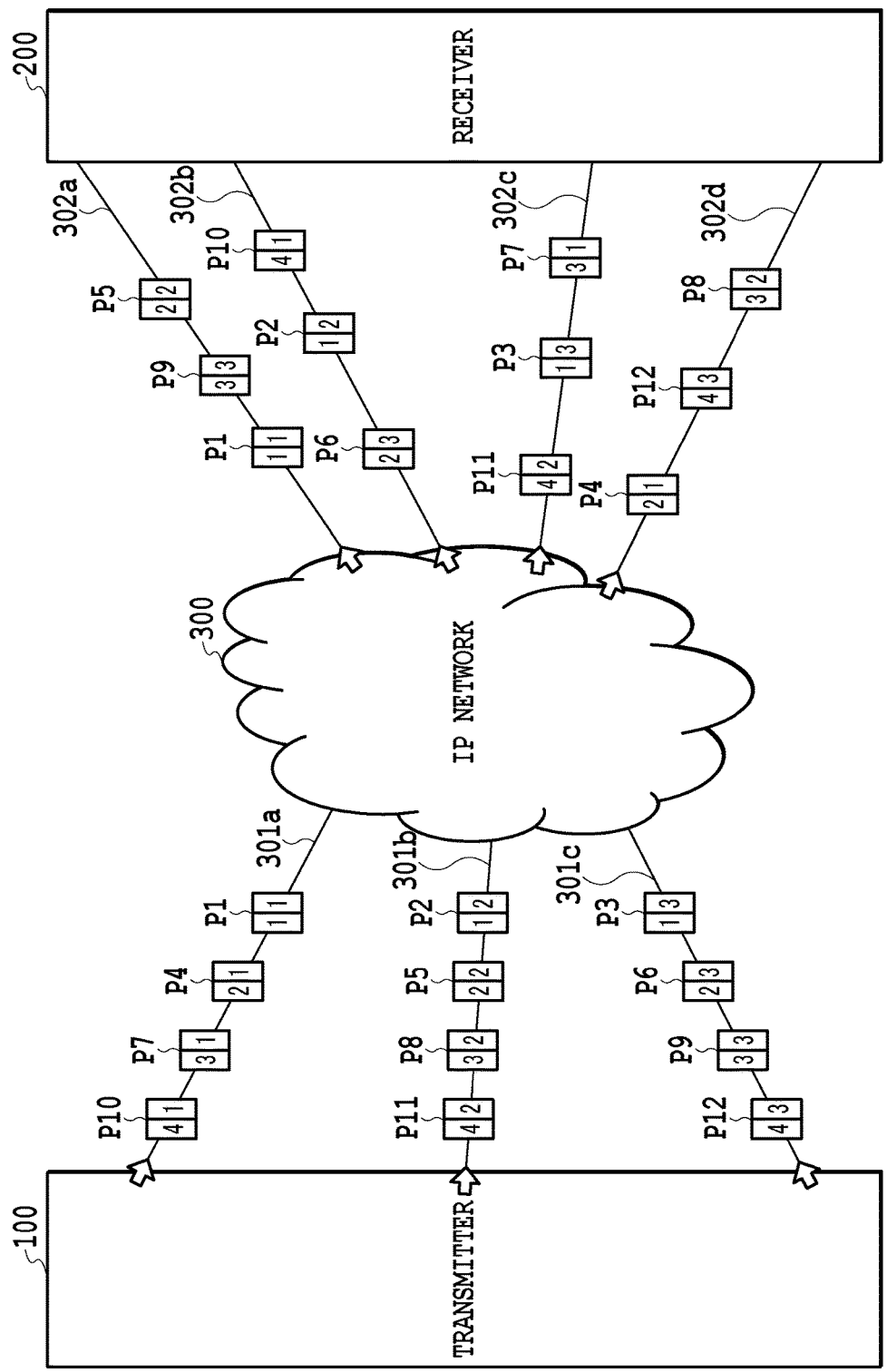
FIG. 4 is a diagram showing an example of IP packets to be transmitted in the video signal transmission system according to the first embodiment of the present invention.

The IP packets to which the sequence numbers are allocated are then transmitted by the transmitting unit/receiving unit 107 to the receiver 200 through the transmission side paths and the reception side paths, as shown in FIG. 4. That is, each IP packet is transmitted to the receiver 200 while being passed through the transmission side path according to the source identifier allocated as shown in Table 5, and being passed through the reception side path according to the destination identifier allocated as shown in Table 6.

Since the IP packets are generated by segmenting the same video signal into the pieces of data and allocating the source identifiers and the destination identifiers thereto as described above, each IP packet is passed through the IP network as an independent IP packet. Moreover, since the source identifiers and the destination identifiers are allocated in round-robin fashion, it is possible to distribute the IP packets evenly among the three transmission side paths 301a to 301c and among the four transmission side paths 302a to 302d.

As described above, the IP packets transmitted from the transmitter 100 are passed through the IP network 300 independently of one another. As a consequence, the receiver 200 receives the IP packets in random order. Hence, the receiver 200 generates the original video signal by rearranging the IP packets on the basis of the first and second sequence numbers allocated by the transmitter 100 and in accordance with the rules shown in Table 7.

In the first embodiment, the first sequence numbers are subsequently allocated to the IP packets in each of the transmission side path groups, and the second sequence numbers are allocated to each set of the IP packets to which the same first sequence number is allocated. However, the present invention is not limited only to this method. For example, instead of allocating the second sequence numbers, time stamps may be set to the respective pieces of data when segmenting the video signal. On the receiver 200 side, the segmented pieces of data belonging to the same transmission path side groups are sorted and then the sorted pieces of data are rearranged on the basis of the time stamps set thereto.

As described above, the original video signal is transmitted to the receiver 200 while segmenting the video signal into the independent IP packets. Thus, the present invention can perform load distribution and transmission of a large-volume video signal more efficiently than the link aggregation.

<Second Embodiment>

Figure 5:
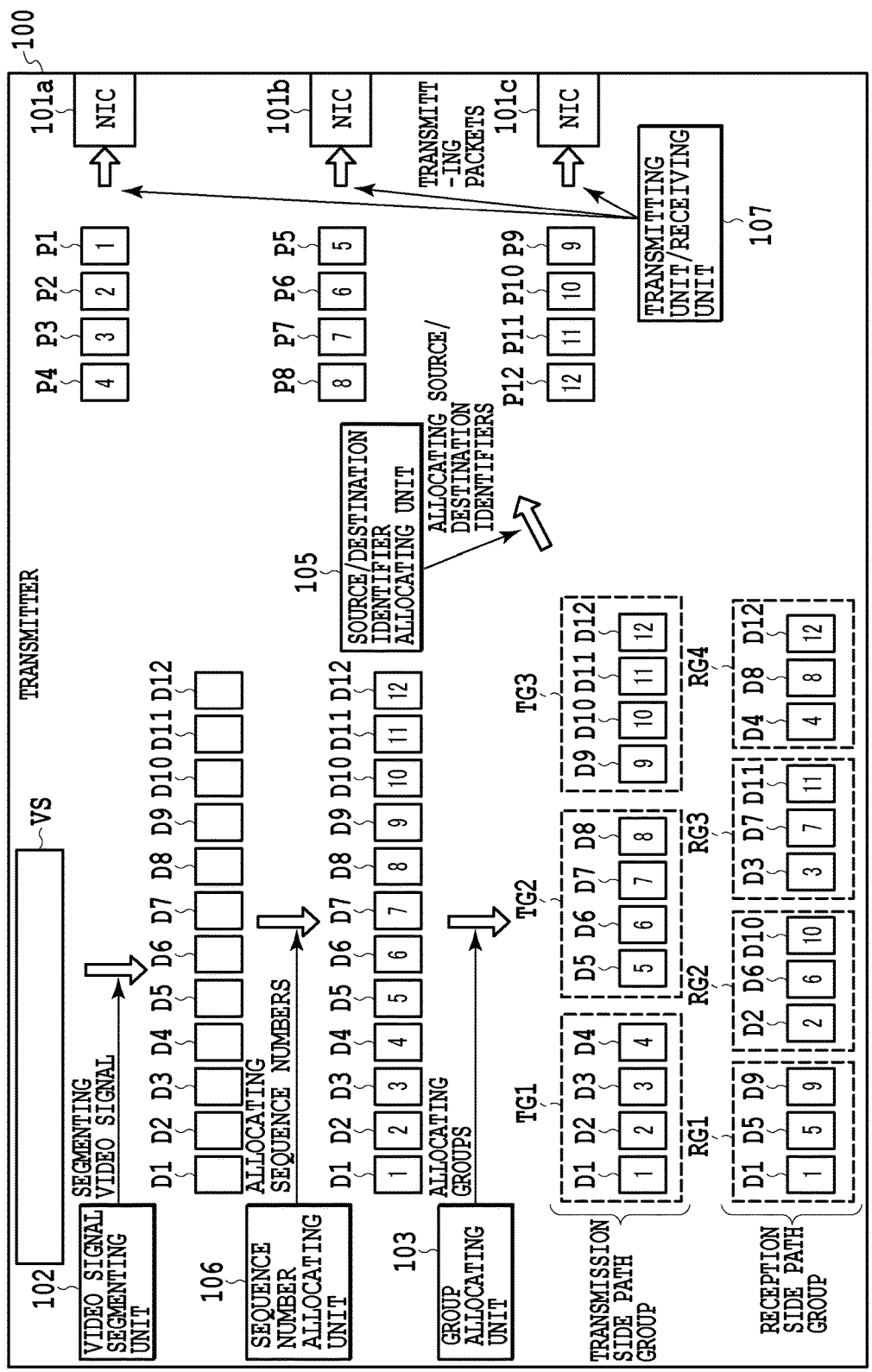
FIG. 5 is a diagram showing an example of processing steps to be performed on a transmitter side of a video signal transmission system according to a second embodiment of the present invention.

Next, an example of a video signal transmission system according to a second embodiment of the present invention will be described with reference to FIG. 5. The second embodiment also employs the configuration of the transmission paths described in FIG. 2. FIG. 5 is a diagram showing an example of processing steps to be performed on the transmitter side of the video signal transmission system according to the second embodiment of the present invention.

First, the video signal segmenting unit 102 segments the video signal VS into the twelve fixed-length pieces of data D1 to D12 as with the first embodiment.

Next, the sequence number allocating unit 106 allocates sequence numbers 1 to 12, which are sequentially defined in chronological order, to the respective pieces of data D1 to D12 segmented by the video signal segmenting unit 102. While the two types of the sequence numbers are allocated in the first embodiment, the sequence numbers of the single type are allocated in the second embodiment.

Next, as with the first embodiment, the group allocating unit 103 forms the segmented pieces of data D1 to D12 into the transmission side path groups and the reception side path groups as shown in Tables 8 and 9.

TABLE 8

Example of Transmission Side Path Groups

| Segmented Pieces of Data | Transmission Side Path Group |
|---|---|
| Pieces of Data D1 to D4 | Transmission Side Path Group TG1 |
| Pieces of Data D5 to D8 | Transmission Side Path Group TG2 |
| Pieces of Data D9 to D12 | Transmission Side Path Group TG3 |

TABLE 9

Example of Reception Side Path Groups

| Segmented Pieces of Data | Reception Side Path Group |
|---|---|
| Pieces of Data D1, D5 and D9 | Reception Side Path Group RG1 |
| Pieces of Data D2, D6, and D10 | Reception Side Path Group RG2 |
| Pieces of Data D3, D7, and D11 | Reception Side Path Group RG3 |
| Pieces of Data D4, D8, and D12 | Reception Side Path Group RG4 |

Next, the source/destination identifier allocating unit 105 allocates the source identifier to each of the transmission side path groups TG1 to TG3 to which each of the pieces of data D1 to D12 belongs (and allocates the destination identifier to each of the reception side path groups RG1 to RG4 likewise). The source identifiers and the destination identifiers are allocated in accordance with Table 5 and Table 6 shown above. Each piece of data to which the source identifier and the destination identifier are allocated is formed into the IP packet by addition of the IP header and the like thereto. In the first embodiment, the sequence numbers are allocated while associating the sequential numbers with the source identifiers and the destination identifiers. On the other hand, in the second embodiment, it is not necessary to associate the sequential numbers with the source identifiers and the destination identifiers, and the sequence number can be associated independently and randomly.

Figure 6:
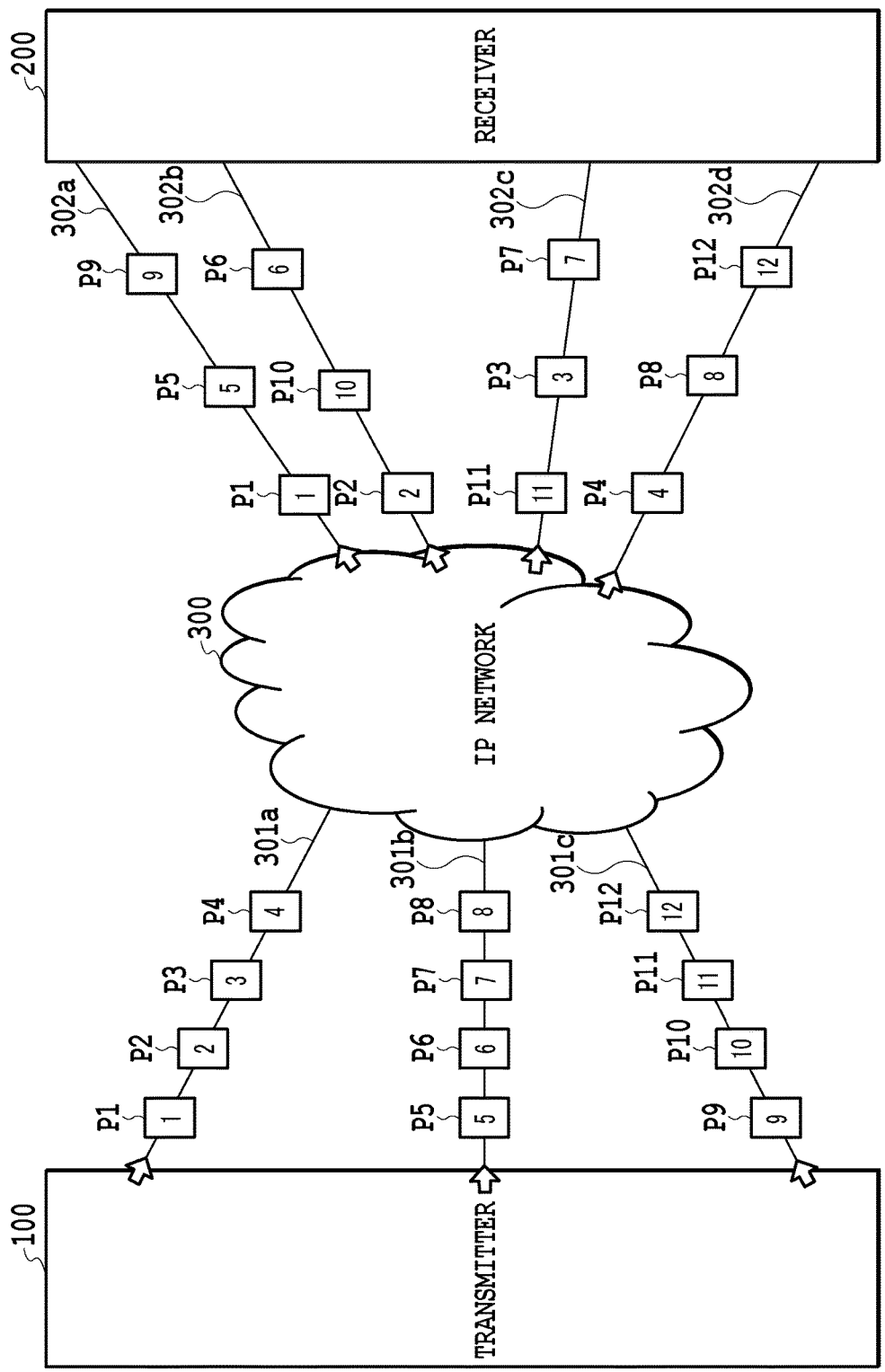
FIG. 6 is a diagram showing an example of IP packets to be transmitted in the video signal transmission system according to the second embodiment of the present invention.

Each of the IP packets P1 to P12, to which the source identifiers and the destination identifiers are allocated, is transmitted by the transmitting unit/receiving unit 107 to the receiver 200 through the transmission side path and the reception side path as shown in FIG. 6. Then, the receiver 200 generates the original video signal by rearranging the IP packets on the basis of the sequence numbers allocated by the sequence number allocating unit 106 of the transmitter 100.

In the second embodiment, the sequence numbers are allocated in chronological order to the respective pieces of data formed by segmenting the original video signal. Accordingly, unlike the first embodiment, this embodiment does not require allocation of the sequence numbers while associating them with the transmission side paths and the reception side paths. In this regard, it is possible to distribute the IP packets more randomly and efficiently than the first embodiment.

<Third Embodiment>

Figure 7:
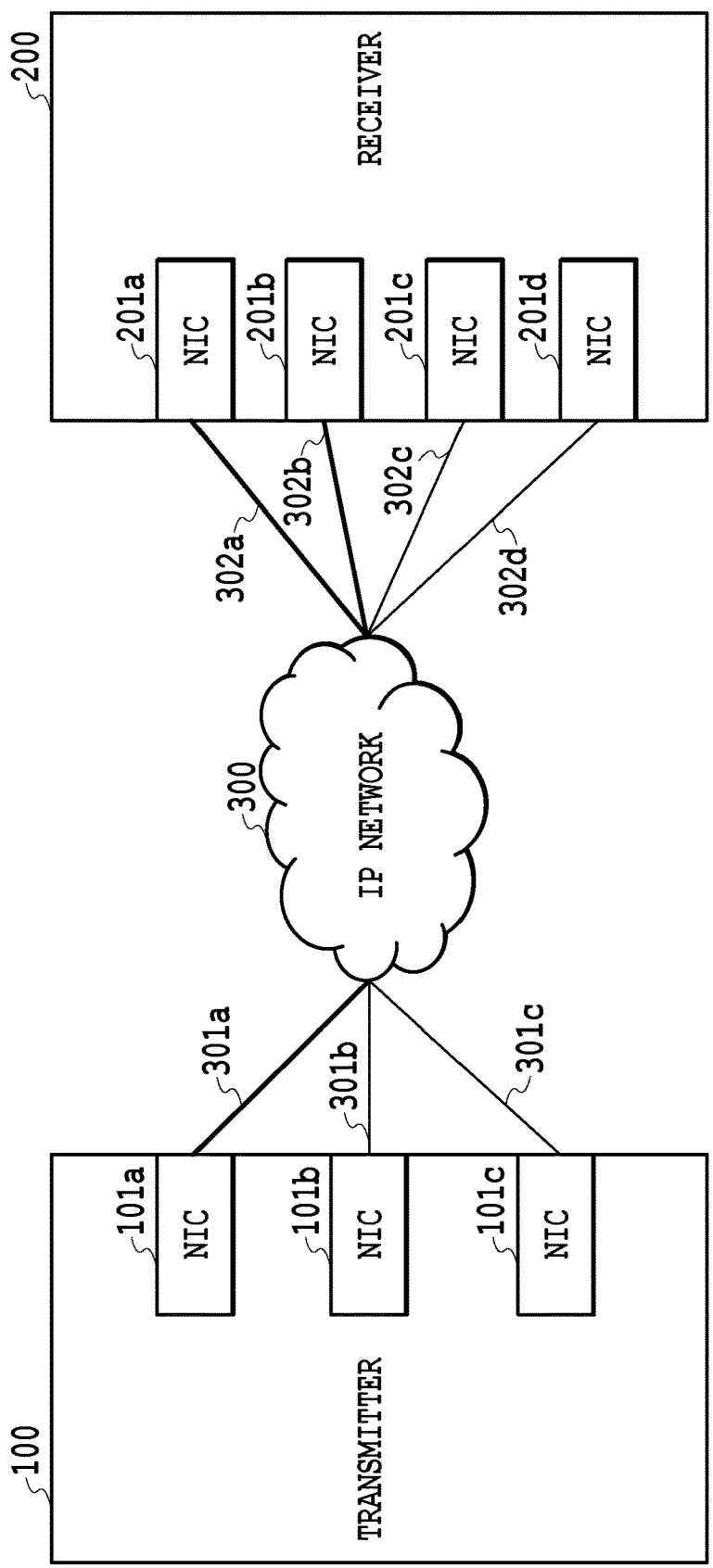
FIG. 7 is a diagram showing an example of transmission paths of a video signal transmission system according to a third embodiment of the present invention.

Next, an example of a video signal transmission system according to a third embodiment of the present invention will be described. FIG. 7 shows an example of transmission paths of the video signal transmission system according to the third embodiment of the present invention. As shown in FIG. 7, the transmitter 100 and the receiver 200 are connected to each other through the IP network 300. The transmission side paths 301*a*, 301*b*, and 301*c* are provided between the transmitter 100 and the IP network 300 (the network device), and are connected to the NICs 101*a* to 101*c*, respectively. Here, the transmission path configuration of this embodiment is different from that of the first embodiment in that the transmission side paths 301*a* to 301*c* have different transmission rates. Specifically, in the transmission path configuration according to the third embodiment, the transmission side path 301*a* has a transmission rate of 100 Gbps while each of the transmission side paths 301*b* and 301*c* has a transmission rate of 10 Gbps, for example.

The reception side paths 302*a*, 302*b*, 302*c*, and 302*d* are provided between the receiver 200 and the IP network 300, and are connected to the NICs 201*a* to 201*d*, respectively. Here, the reception side paths 302*a* to 302*d* also have different transmission rates. For example, each of the reception side paths 302*a* and 302*b* has a transmission rate of 100 Gbps while each of the reception side paths 302*c* and 302*d* has a transmission rate of 10 Gbps.

The source identifiers are allocated to the NICs 101*a* to 101*c* as shown in Table 5, and the destination identifiers are allocated to the NICs 201*a* to 201*d* as shown in Table 6.

Figure 8:
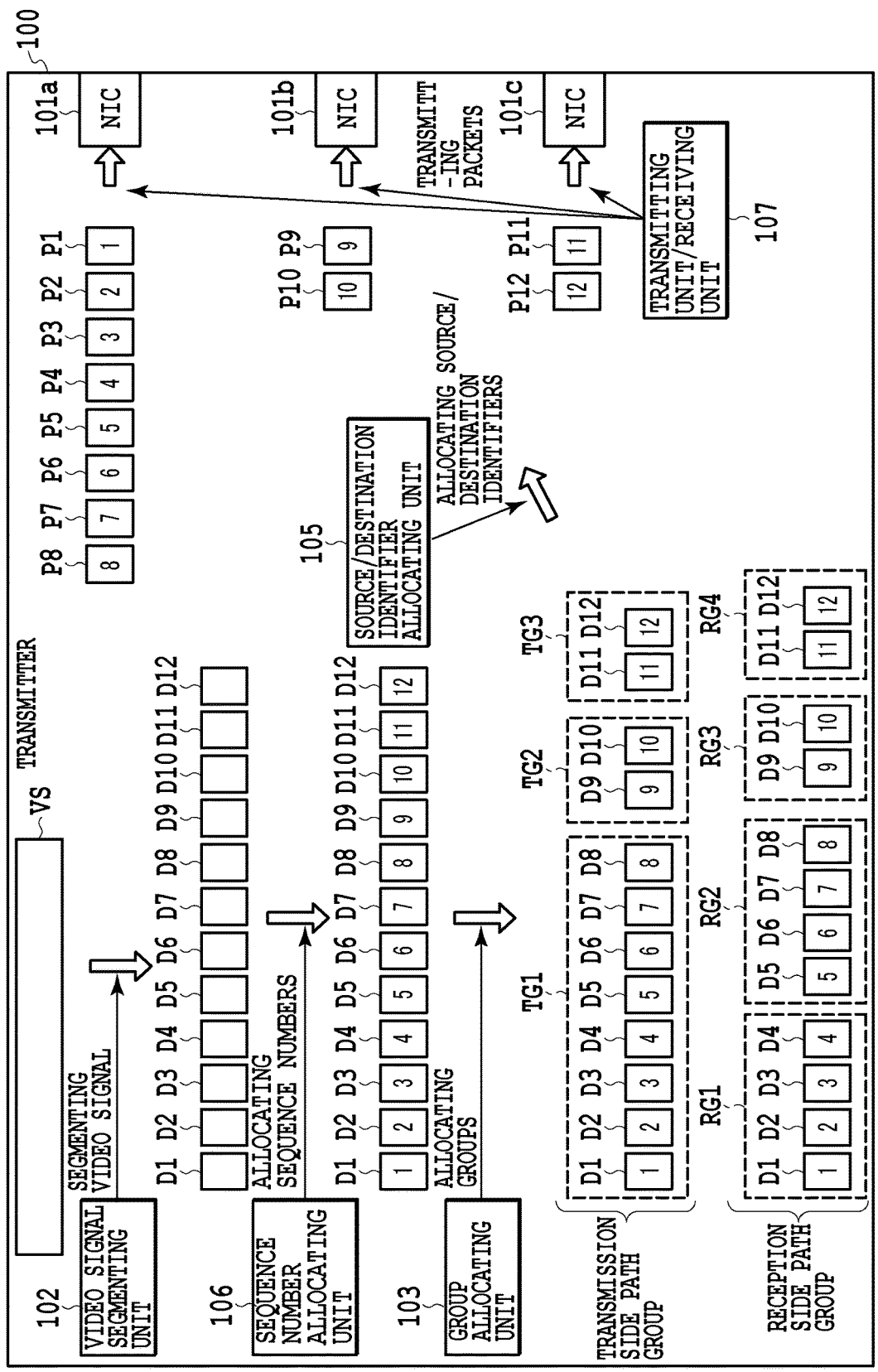
FIG. 8 is a diagram showing an example of processing steps to be performed on a transmitter side of the video signal transmission system according to the third embodiment of the present invention.

Next, an example of processing steps to be performed by the transmitter 100 will be described with reference to FIG. 8. The transmitter 100 has information on the transmission rates provided to the transmission side paths 301*a* to 301*c* and the reception side paths 302*a* to 302*d* described above (hereinafter referred to as a "transmission rate information table", which is shown in Table 10).

TABLE 10

Example of Transmission Rate Information Table

| Transmission Path | Transmission Rate |
| --- | --- |
| Transmission Side Path 301a | 100 Gbps |
| Transmission Side Path 301b | 10 Gbps |
| Transmission Side Path 301c | 10 Gbps |
| Reception Side Path 302a | 100 Gbps |
| Reception Side Path 302b | 100 Gbps |
| Reception Side Path 302c | 10 Gbps |
| Reception Side Path 302d | 10 Gbps |

First, the video signal segmenting unit 102 segments the video signal VS into the twelve fixed-length pieces of data D1 to D12 as with the first and second embodiments.

Next, the sequence number allocating unit 106 allocates the sequence numbers 1 to 12, which are sequentially defined in chronological order, to the respective pieces of data D1 to D12 segmented by the video signal segmenting unit 102. Here, in the third embodiment, the sequence numbers are allocated by using the same method as that described in the second embodiment. Instead, the sequence numbers may be allocated while associating the two types of the sequence numbers with the transmission paths as shown in Table 7.

Next, the group allocating unit 103 refers to the transmission rate information table, and forms the segmented pieces of data D1 to D12 into the transmission side path groups TG1 to TG3 based on the respective transmission rates provided to the transmission side paths 301*a* to 301*c*. For example, in this embodiment, the transmission rates of the transmission side paths 301*a* to 301*c* have a proportion of 10:1:1, while the transmission rates of the reception side paths 302*a* to 302*d* have a proportion of 10:10:1:1. Accordingly, the pieces of data are formed into groups as shown in Table 11.

TABLE 11

Example of Transmission Side Path Groups

| Segmented Pieces of Data | Transmission Side Path Group |
| --- | --- |
| Pieces of Data D1 to D8 | Transmission Side Path Group TG1 |
| Pieces of Data D9 and D10 | Transmission Side Path Group TG2 |
| Pieces of Data D11 and D12 | Transmission Side Path Group TG3 |

As shown in Table 11, the transmission side path 301*a* has the transmission rate which is 10 times as large as each of the transmission side paths 301*b* and 301*c*. Accordingly, an amount of the data to be allocated to the transmission through the transmission side path 301*a* is made 4 times as large as that to be allocated to each of the transmission side paths 301*b* and 301*c*. Note that the above-mentioned proportion of data allocation is merely exemplary. For instance, the data may be allocated at the proportion of 10:1:1 in accordance with the actual proportion of the transmission rates.

In addition, regarding the reception side path groups as well, the pieces of data are formed into groups as shown in Table 12 on the basis of the respective transmission rates provided to the reception side paths 302a to 302d.

TABLE 12

Example of Reception Side Path Groups

| Segmented Pieces of Data | Reception Side Path Group |
|---|---|
| Pieces of Data D1 to D4 | Reception Side Path Group RG1 |
| Pieces of Data D5 to D8 | Reception Side Path Group RG2 |
| Pieces of Data D9 and D10 | Reception Side Path Group RG3 |
| Pieces of Data D11 and D12 | Reception Side Path Group RG4 |

Next, the source/destination identifier allocating unit 105 allocates the source identifier to each of the transmission side path groups TG1 to TG3 to which each of the pieces of data D1 to D12 belongs (and allocates the destination identifier to each of the reception side path groups RG1 to RG4 likewise). The source identifiers and the destination identifiers are allocated in accordance with Table 5 and Table 6 shown above. Each piece of data to which the source identifier and the destination identifier are allocated is formed into the IP packet by addition of the IP header and the like thereto.

Figure 9:
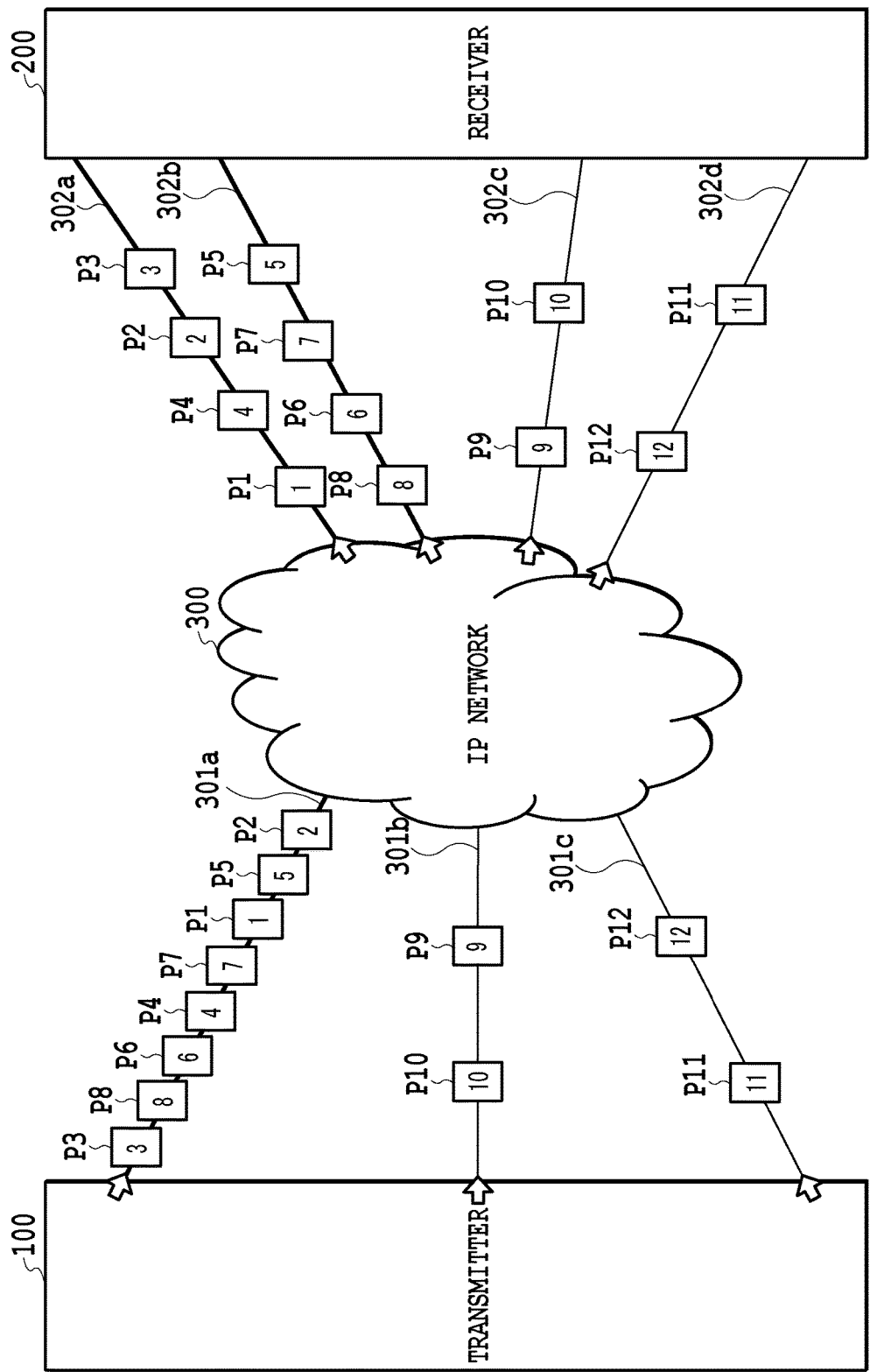
FIG. 9 is a diagram showing an example of IP packets to be transmitted in the video signal transmission system according to the third embodiment of the present invention.

Each of the IP packets, to which the source identifiers and the destination identifiers are allocated, is transmitted by the transmitting unit/receiving unit 107 to the receiver 200 through the transmission side path and the reception side path as shown in FIG. 9. Then, the receiver 200 generates the original video signal by rearranging the IP packets on the basis of the sequence numbers allocated by the transmitter 100.

In the third embodiment, the segmented pieces of data are allocated depending on the transmission rates of the transmission side paths and the reception side paths (in other words, the numbers of the IP packets to be transmitted are changed depending on the transmission rates). Thus, it is possible to efficiently distribute the packets to be transmitted even when the plurality of transmission paths have different transmission rates.

Note that the segmented fixed-length pieces of data are formed into the groups depending on the transmission rates of the respective transmission paths in the third embodiment. However, the present invention is not limited only to this method. For example, the video signal segmenting unit 102 may segment the video signal into pieces of data having various data lengths depending on the transmission rates of the respective transmission paths.

<Transmission Path Failure>

Figure 10:
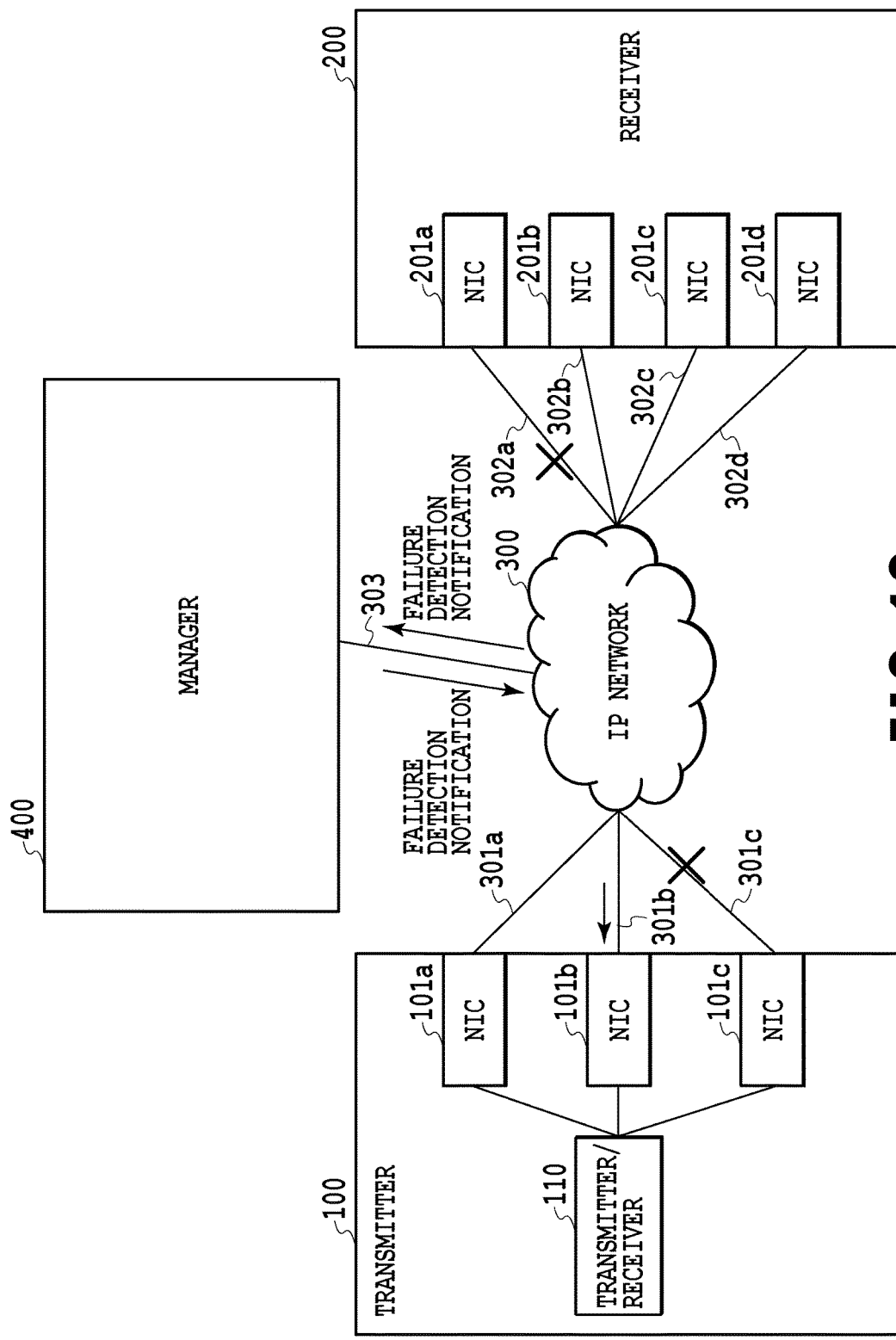
FIG. 10 is a diagram showing an example of a configuration which implements a fallback configuration in the case of a failure in the video signal transmission system according to one of the embodiments of the present invention.

Next, a description will be given of a fallback operation when any of the transmission side paths and the reception side paths fails. As shown in FIG. 10, the transmitter 100 and the receiver 200 are connected to each other through the IP network 300. Moreover, a manager 400 is connected to the transmitter 100 and the receiver 200 through the IP network 300 (via a failure information communication path 303). The configurations of the transmission side paths 301a to 301c and of the reception side paths 302a to 302d are assumed to be the same as the configurations described in FIG. 7.

When any of the transmission side paths 301a to 301c and the reception side paths 302a to 302d fails, the manager 400 receives failure notification concerning the failure. Such failure information is transmitted, for example, from a network device, which is connected to any of the transmission side paths 301a to 301c and the reception side paths 302a to 302d, to the manager 400 by using the SNMP (Simple Network Management Protocol) and the like. Alternatively, the manager 400 may perform polling on the network devices at periodic intervals. Here, if there is no response from one of the network devices, then the manager 400 may determine that the transmission path connected to the relevant device has failed. The failure information at least includes information that enables identification as to which one of the transmission side paths 301a to 301c and the reception side paths 302a to 302d has failed.

Having received the failure notification, the manager 400 transmits the failure notification to the transmitter 100 through the failure information communication path 303. This configuration enables the transmitter 100 to identify the transmission path that has failed. In this embodiment, the transmission side path 301c and the reception side path 302a are assumed to have failed.

Next, having received the failure notification, the transmitter 100 updates the transmission rate information table as shown in Table 13 by deleting the transmission side path 301c and the reception side path 302a from the transmission rate information table shown in Table 10.

TABLE 13

Updated Transmission Rate Information Table

| Transmission Path | Transmission Rate |
|---|---|
| Transmission Side Path 301a | 100 Gbps |
| Transmission Side Path 301b | 10 Gbps |
| Reception Side Path 302b | 100 Gbps |
| Reception Side Path 302c | 10 Gbps |
| Reception Side Path 302d | 10 Gbps |

Next, the group allocating unit 103 refers to the updated transmission rate information table, and forms the pieces of data D1 to D12 segmented by the video signal segmenting unit 102 into the transmission side path groups. The same applies to the reception side path groups. Examples of the grouping are shown in Tables 14 and 15.

TABLE 14

Example of Transmission Side Path Groups

| Segmented Pieces of Data | Transmission Side Path Group |
|---|---|
| Pieces of Data D1 to D9 | Transmission Side Path Group TG1 |
| Pieces of Data D10 to D12 | Transmission Side Path Group TG2 |

TABLE 15

Example of Reception Side Path Groups

| Segmented Pieces of Data | Reception Side Path Group |
|---|---|
| Pieces of Data D1 to D8 | Reception Side Path Group RG2 |
| Pieces of Data D9 and D10 | Reception Side Path Group RG3 |
| Pieces of Data D11 and D12 | Reception Side Path Group RG4 |

After the segmented pieces of data are formed into the groups, the source/destination identifier allocating unit 105 allocates the source identifier corresponding to any of the transmission side paths 301a and 301b to each segmented piece of data which belongs to any of the transmission side paths TG1 and TG2. Likewise, the destination identifier corresponding to any of the reception side paths 302b to 302d is allocated to each segmented piece of data which belongs to any of the reception side paths RG2 to RG4. Each piece of data to which the source identifier and the destination identifier are allocated is formed into the IP packet by addition of the IP header and the like thereto.

Figure 11:
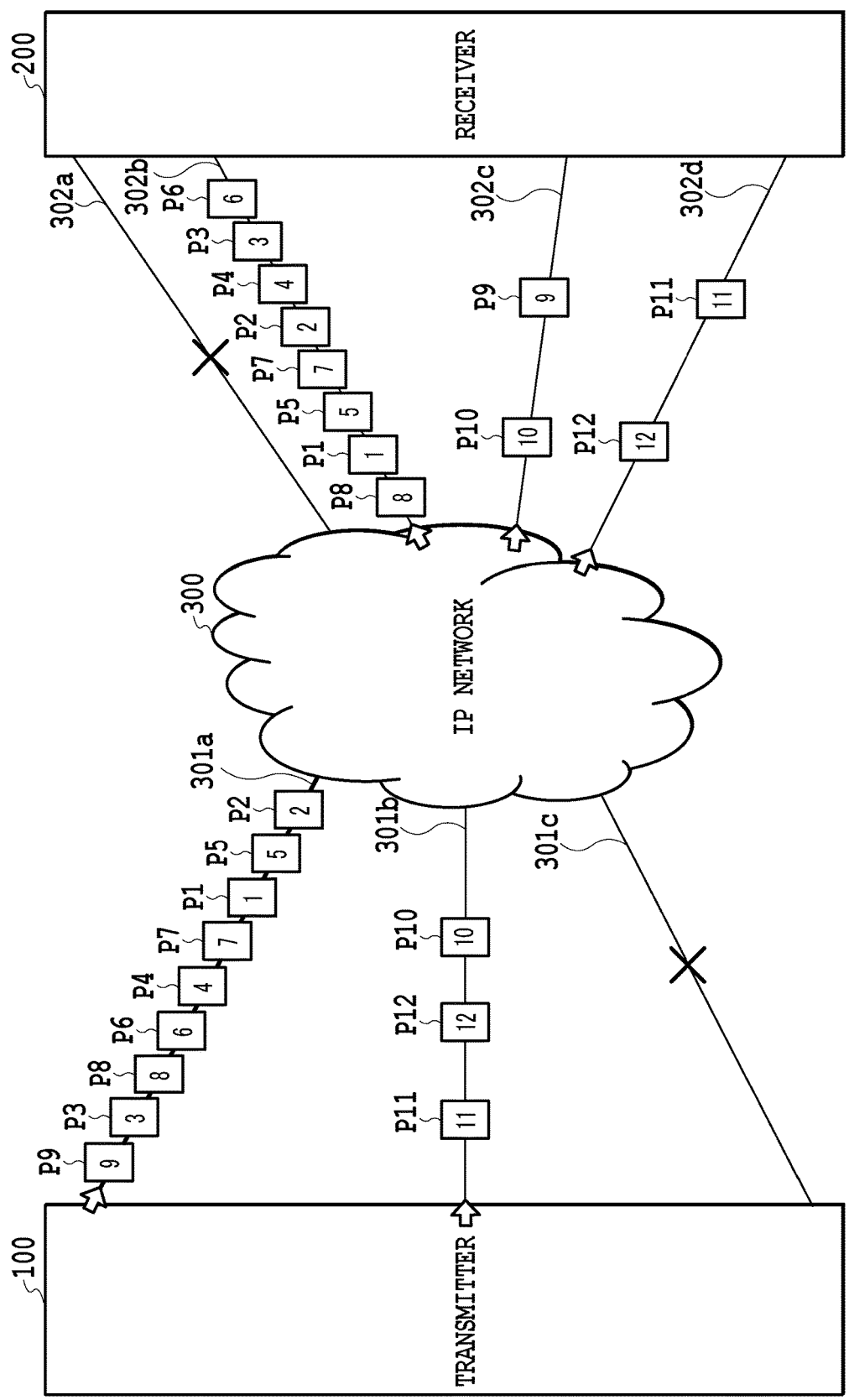
FIG. 11 is a diagram showing an example of IP packets to be transmitted on the fallback configuration of the video signal transmission system according to the one of the embodiments of the present invention.

Each of the IP packets P1 to P12, to which the source identifiers and the destination identifiers are allocated, is transmitted by the transmitting unit/receiving unit 107 to the receiver 200 through the transmission side path and the reception side path as shown in FIG. 11. In this way, even when any of the transmission side paths and the reception side paths fails, it is possible to distribute the IP packets while establishing the fallback of the transmission paths.

Note that the segmented fixed-length pieces of data are formed into the groups depending on the transmission rates of the respective transmission paths in the fallback configuration in this embodiment. However, the present invention is not limited only to this method. For example, the video signal segmenting unit 102 may segment the video signal into pieces of data having various data lengths depending on the transmission rates of the respective transmission paths in the fallback configuration. Further, the group allocating unit 103 may form the segmented pieces of data D1 to D12 into the transmission side path groups TG1 to TG2 and the reception side path groups RG2 to RG4 respectively in the order of the segmented pieces of data D1 to D12 (round-robin fashion).

In addition to the above, in the above-described fallback configuration, the first sequence numbers may be allocated to the IP packets in each of the two transmission side path groups TG1 to TG2, and the second sequence numbers may be allocated to each set of the IP packets to which the same first sequence number is allocated (as with the manner shown in Table 7). Alternatively, the single type of sequence numbers 1 to 12, which are sequentially defined in chronological order, may be allocated to the respective pieces of data D1 to D12 (as with the manner described in the second and third embodiments).

In the above-described fallback configuration in the event of a failure, the failure notification is conducted by means of the manager 400. However, the present invention is not limited only to this configuration. For example, a failure may be detected by causing the transmitter 100 and the receiver 200 to perform polling on the respective transmission paths. For instance, if a certain transmission path does not respond within a prescribed time period in the course of the polling, then the relevant transmission path may be deemed to have failed. In the meantime, the receiver 200 may send the transmitter 100 the failure information on the certain transmission path.

The video image transmission system according to the present invention has been described above. It is to be noted that the above-described processing steps to be performed by the constituents and the order of the processing steps are merely exemplary. For instance, the order of the processing steps including the allocation of the sequence numbers to the pieces of data formed by segmenting the video signal, the grouping, the allocation of the source/destination identifiers, and the like may be changed. Alternatively, these processing steps may be performed at the same time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A transmitter configured to transmit a video signal to a receiver, the transmitter and the receiver being connected to each other through an IP network, the receiver being connected to a plurality of reception side paths, the receiver including a plurality of destination network interfaces, each of the plurality of destination network interfaces including a destination identifier that is at least one of: a virtual LAN identifier, a source IP address and a source MAC address, the transmitter comprising:
  a plurality of source network interfaces connected to a plurality of transmission side paths, each of the plurality of source network interfaces including a source identifier that is at least one of: a virtual LAN identifier, a source IP address and a source MAC address;
  a video signal segmenting unit configured to segment the video signal into a plurality of pieces of data;
  a group allocating unit configured to allocate the segmented plurality of pieces of data to a plurality of transmission side path groups respectively, and to a plurality of reception side path groups respectively;
  a source/destination identifier allocating unit configured to allocate the source identifier to each of the plurality of pieces of data allocated to the transmission side path groups, and allocate the destination identifier to each of the plurality of pieces of data allocated to the reception side path groups;
  a sequence number allocating unit configured to allocate a sequence number to each of the plurality of pieces of data allocated the source identifier and the destination identifier;
  an IP packet generating unit configured to generate a plurality of IP packets by adding IP headers to the plurality of pieces of data, respectively, to which the sequence numbers are allocated; and
  a transmitting unit configured to transmit each of the generated plurality of IP packets independently through the plurality of source network interfaces respectively, according to the allocated source identifier,
  wherein the transmitted plurality of IP packets pass through the plurality of destination network interfaces respectively according to the allocated destination identifier.

2. The transmitter according to claim 1, wherein
the sequence number allocating unit is further configured to:
  allocate a first sequence number to the plurality of pieces of data allocated to the same group of the plurality of transmission side path groups; and
  allocate a second sequence number to the plurality of pieces of data allocated the same sequence number of the first sequence number.

3. The transmitter according to claim 1, wherein the group allocating unit is further configured to:
  allocate the segmented plurality of pieces of data to the plurality of transmission side path groups respectively according to a transmission rate of the transmission side paths; and
  allocate the segmented plurality of pieces of data to the plurality of reception side path groups respectively according to a transmission rate of the reception side paths.

4. The transmitter according to claim 1, further comprising:
  a receiving unit configured to receive failure information concerning a failed transmission side path of the plurality of transmission side paths and/or a failed reception side path of the plurality of reception side paths,
  the group allocating unit is further configured to:
    in response to receiving the failure information concerning the failed transmission side path, allocate the plurality of pieces of data to the plurality of transmission side path groups respectively, except for the transmission side path group corresponding to the failed transmission side path; and in response to receiving the failure information concerning the failed reception side path, allocate the plurality of pieces of data to the plurality of reception side path groups respectively, except for the reception side path group corresponding to the failed reception side path.

5. A video signal transmission system configured to transmit a video signal from a transmitter to a receiver, the transmitter and the receiver being connected to each other through an IP network, the video signal transmission system comprising:

the transmitter including:
  a plurality of source network interfaces connected to a plurality of transmission side paths, each of the plurality of source network interfaces including a source identifier that is at least one of: a virtual LAN identifier, a source IP address and a source MAC address;
  a video signal segmenting unit configured to segment the video signal into a plurality of pieces of data;
  a group allocating unit configured to allocate the segmented plurality of pieces of data to a plurality of transmission side path groups respectively, and to a plurality of reception side path groups respectively;
  a source/destination identifier allocating unit configured to allocate the source identifier to each of the plurality of pieces of data allocated to transmission side path groups, and allocate the destination identifier to each of the plurality of pieces of data allocated to reception side path groups;
  a sequence number allocating unit configured to allocate a sequence number to each of the plurality of pieces of data allocated the source identifier and the destination identifier;
  an IP packet generating unit configured to generate a plurality of IP packets by adding IP headers to the plurality of pieces of data, respectively, to which the sequence numbers are allocated; and
  a transmitting unit configured to transmit each of the generated plurality of IP packets independently through the plurality of source network interfaces respectively according to the allocated source identifier, and the receiver including:
  a plurality of destination network interfaces connected to a plurality of reception side paths, each of the plurality of destination network interfaces including a destination identifier that is at least one of: a virtual LAN identifier, a source IP address and a source MAC address;
  a receiving unit configured to receive the plurality of IP packets, which are transmitted independently, through the plurality of destination network interfaces respectively, the received plurality of IP packets pass through the plurality of destination network interfaces respectively according to the allocated destination identifier; and
  a video signal generating unit configured to generate the video signal by rearranging the received plurality of IP packets on the basis of the allocated sequence numbers.

6. A video signal transmission method of transmitting a video signal from a transmitter to a receiver, the transmitter and the receiver being connected to each other through an IP network; the transmitter including: a plurality of source network interfaces connected to a plurality of transmission side paths, each of the plurality of source network interfaces including a source identifier that is at least one of a virtual LAN identifier, a source IP address and a source MAC address; and the receiver including: a plurality of destination network interfaces connected to a plurality of reception side paths, each of the plurality of destination network interfaces including a destination identifier that is at least one of a virtual LAN identifier, a source IP address and a source MAC address; the video signal transmission method comprising:

segmenting, by the transmitter, the video signal into a plurality of pieces of data;

allocating, by the transmitter, the segmented plurality of pieces of data to a plurality of transmission side path groups respectively, and to a plurality of reception side path groups respectively;

allocating, by the transmitter, the source identifier to each of the plurality of pieces of data allocated to transmission side path groups;

allocating, by the transmitter, the destination identifier to each of the plurality of pieces of data allocated to reception side path groups;

allocating, by the transmitter, a sequence number to each of the plurality of pieces of data allocated the source identifier and the destination identifier;

generating, by the transmitter, a plurality of IP packets by adding IP headers to the plurality of pieces of data, respectively, to which the sequence numbers are allocated;

transmitting, by the transmitter, each of the generated plurality of IP packets independently the plurality of source network interfaces respectively according to the allocated source identifier;

receiving, by the receiver, the plurality of IP packets, which are transmitted independently, through the plurality of destination network interfaces respectively, the received plurality of IP packets pass through the plurality of destination network interfaces respectively according to the allocated destination identifier; and generating, by the receiver, the video signal by rearranging the received plurality of IP packets on the basis of the allocated sequence numbers.

* * * * *